United States Patent
Saen et al.

(10) Patent No.: US 9,991,749 B2
(45) Date of Patent: Jun. 5, 2018

(54) COIL UNIT, WIRELESS POWER FEEDING DEVICE, WIRELESS POWER RECEIVING DEVICE, AND WIRELESS POWER TRANSMISSION DEVICE

(71) Applicant: TDK CORPORATION, Tokyo (JP)

(72) Inventors: Tsunehiro Saen, Tokyo (JP); Tetsuya Nishiyama, Tokyo (JP); Mitsunari Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 156 days.

(21) Appl. No.: 15/049,245

(22) Filed: Feb. 22, 2016

(65) Prior Publication Data
US 2016/0254706 A1    Sep. 1, 2016

(30) Foreign Application Priority Data

Feb. 24, 2015  (JP) .................. 2015-034167
Feb. 10, 2016  (JP) .................. 2016-023725

(51) Int. Cl.
| | |
|---|---|
| *H02J 50/12* | (2016.01) |
| *H02J 7/02* | (2016.01) |
| *B60L 11/18* | (2006.01) |
| *H01F 38/14* | (2006.01) |

(52) U.S. Cl.
CPC .......... *H02J 50/12* (2016.02); *B60L 11/182* (2013.01); *H01F 38/14* (2013.01); *H02J 7/025* (2013.01)

(58) Field of Classification Search
CPC .......... H01F 38/14; H01F 27/24; H01F 27/36; H01F 41/02; H02J 7/025; H02J 50/80; H02J 50/12; H02J 50/10; H02J 50/60
USPC ........................................ 307/104
See application file for complete search history.

(56) References Cited

U.S. PATENT DOCUMENTS

| | | | |
|---|---|---|---|
| 9,524,823 B2 | 12/2016 | Miyashita et al. | |
| 2014/0175899 A1* | 6/2014 | Miyashita ........... | H01F 38/14 307/104 |

FOREIGN PATENT DOCUMENTS

| | | |
|---|---|---|
| JP | 2010-093180 A | 4/2010 |
| WO | 2013/065324 A1 | 5/2013 |

* cited by examiner

*Primary Examiner* — John Poos
(74) *Attorney, Agent, or Firm* — Oliff PLC

(57) ABSTRACT

A coil unit, a wireless power feeding device, a wireless power receiving device, and a wireless power transmission device are provided that are capable of reducing high voltage induced on the metal part. A coil unit Lu1 includes a power transmission coil L1, a first reactance circuit X10 that is connected to one end portion of the winding of the power transmission coil L1 and forms a resonant circuit together with the power transmission coil L1, a metal part SD disposed on the same side as the back side of the power transmission coil L1, and a first adjustment capacitor C10 connected between the other end portion of the winding of the power transmission coil L1 and the metal part SD.

16 Claims, 11 Drawing Sheets

FIG. 3a
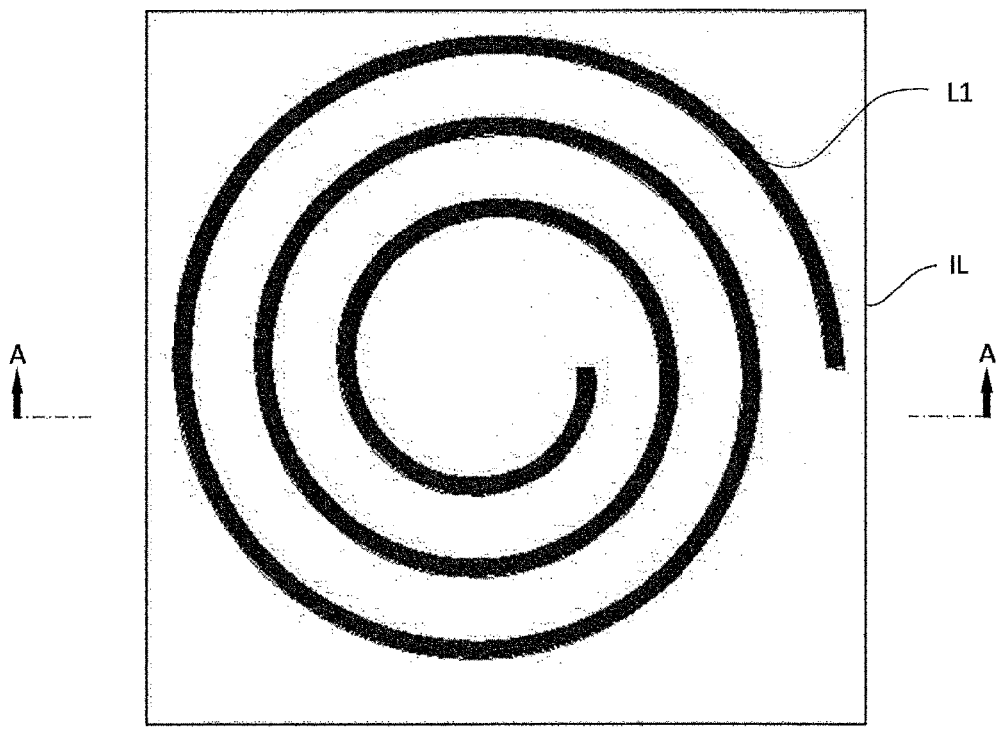
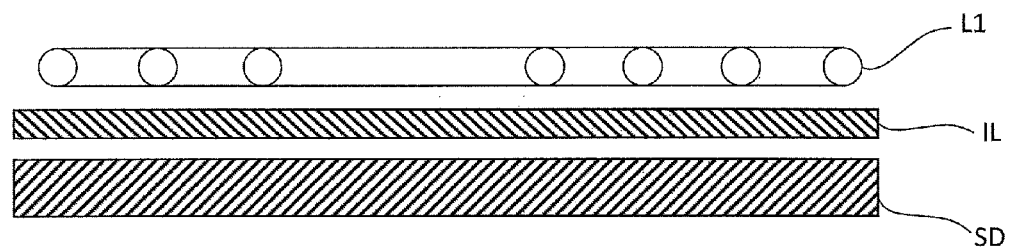
FIG. 3b

FIG. 7a
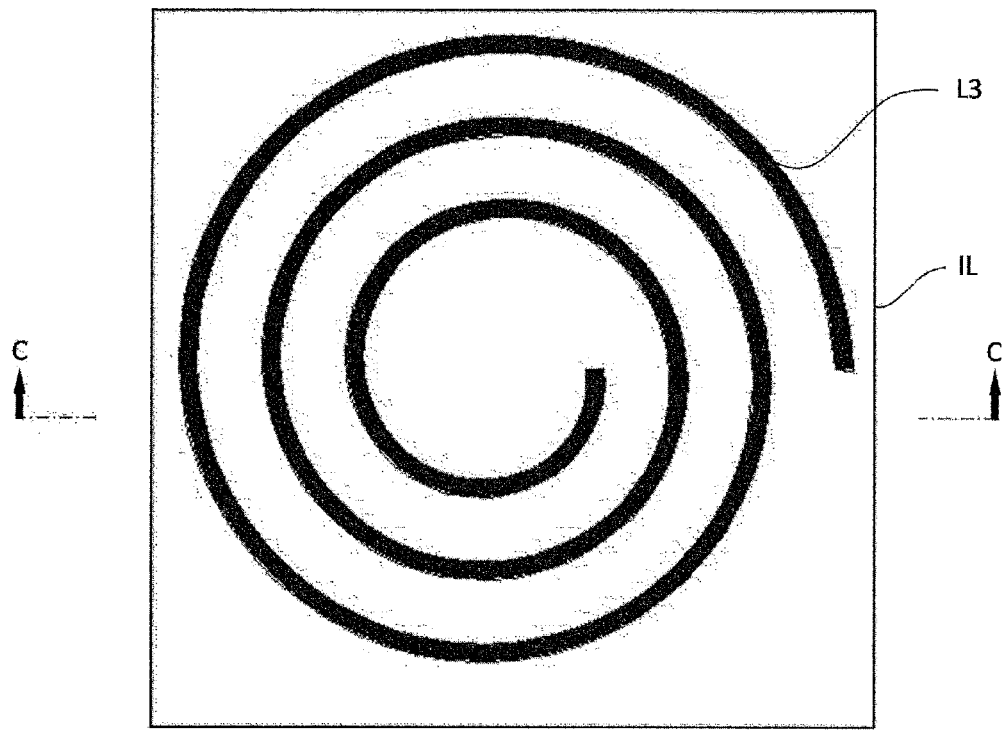
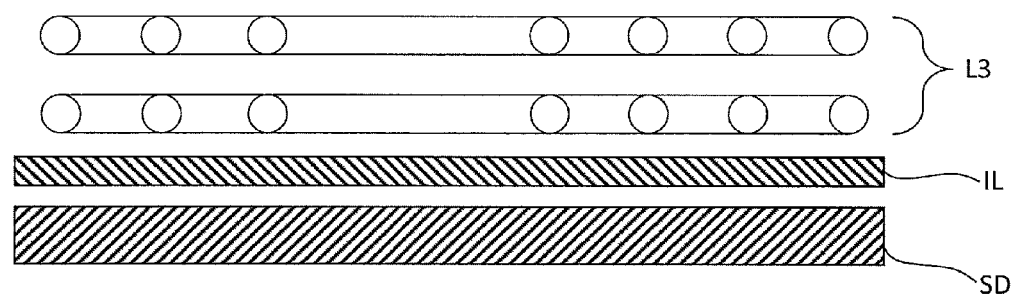
FIG. 7b

FIG. 9a
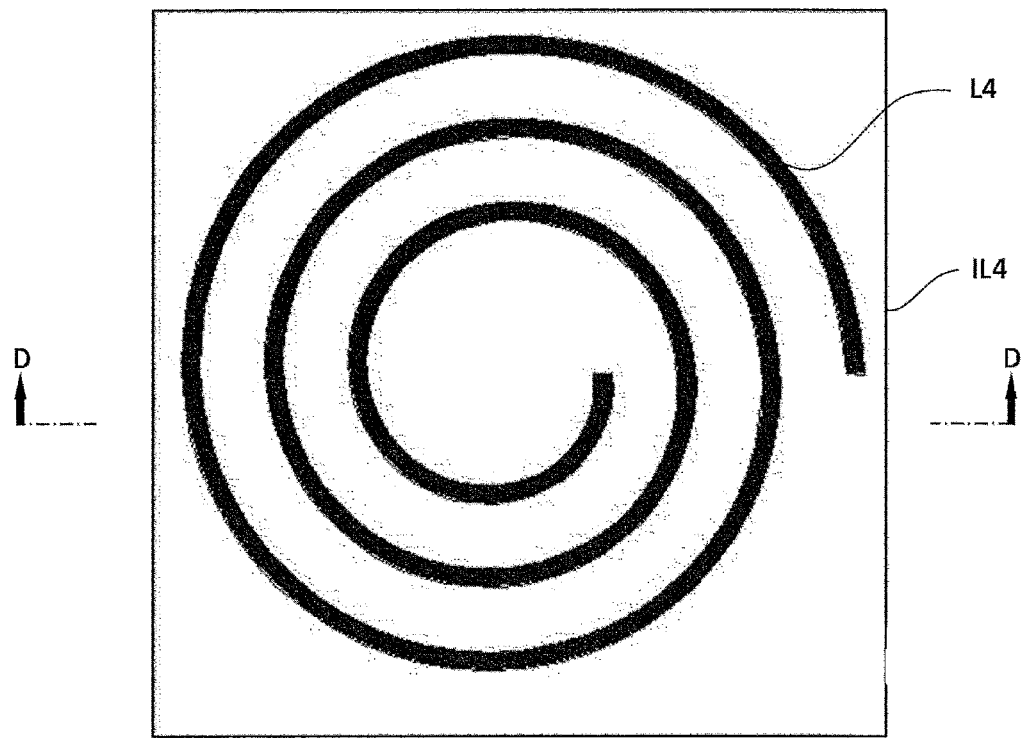
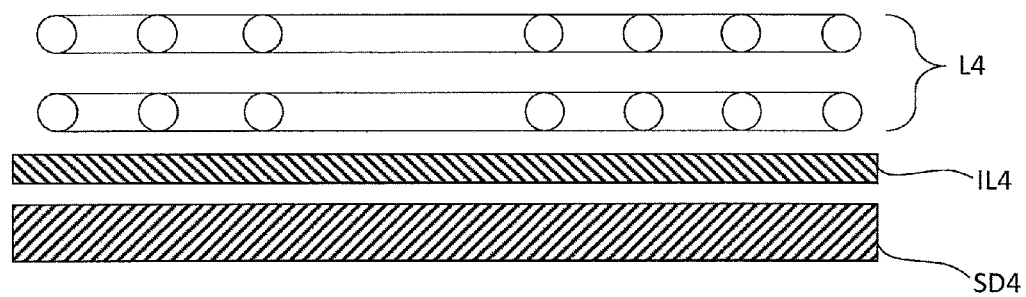
FIG. 9b

COIL UNIT, WIRELESS POWER FEEDING DEVICE, WIRELESS POWER RECEIVING DEVICE, AND WIRELESS POWER TRANSMISSION DEVICE

BACKGROUND

The present invention relates to a coil unit, a wireless power feeding device, a wireless power receiving device, and a wireless power transmission device.

Recent years have seen growing attention in the fields of electric vehicles and mobile devices to wireless power transmission technologies that wirelessly supply electric power from external sources without use of power cables. When such wireless power transmission technologies are used for chargers that require large power transmission, such as those used in electric vehicles, a large current needs to be passed through the power transmitting coil, leading to an increase in leakage flux. This may cause adverse effects on nearby electronics, such as electromagnetic interference.

To address this problem, for example, Patent Reference 1 discloses a contactless power feeding device whose primary and secondary sides each include the following components arranged in the order given below, as viewed from the air gap: a coil with a flat structure wound in a spiral shape, a ferrite core having a flat planar shape, and an aluminum plate having a flat planar shape. The aluminum plate blocks exposure of leakage flux to the outside.

CITED REFERENCES

Patent Reference

[Patent Reference 1] Japanese Unexamined Patent Application Publication No. 2010-93180

SUMMARY

In the field of wireless power transmission technologies, systems that utilize the resonance (sympathetic resonance) phenomenon are becoming mainstream. Compared with electromagnetic induction, use of the resonance phenomenon has an advantage of allowing the distance between the power transmitting and receiving sides to be increased. Such wireless power transmission technologies using the resonance phenomenon require that a reactance circuit for generating resonance be connected to either the starting edge or end edge of the winding of the power transmission coil. However, if such a reactance circuit for generating resonance is connected to only one of the starting edge and end edge of the winding of the power transmission coil, a potential difference develops between the starting edge and end edge of the winding of the power transmission coil. Consequently, a high induced voltage to ground is generated on the metal part owing to the developed potential difference via a parasitic capacitance.

The present invention has been made in view of the above-mentioned problem, and accordingly it is an object of the present invention to provide a coil unit, a wireless power feeding device, a wireless power receiving device, and a wireless power transmission device that are capable of reducing high voltage induced on the metal part.

A coil unit according to the present invention includes a power transmission coil, a first reactance circuit that is connected to one end portion of a winding of the power transmission coil, and forms a resonant circuit together with the power transmission coil, a metal part disposed on the same side as a back side of the power transmission coil, and a first adjustment capacitor connected between another end portion of the winding of the power transmission coil and the metal part.

According to the present invention, the coil unit includes the first reactance circuit that is connected to one end portion of the winding of the power transmission coil and forms a resonant circuit together with the power transmission coil, and the first adjustment capacitor connected to the other end portion of the winding of the power transmission coil and the metal part. Accordingly, the first adjustment capacitor is combined with the parasitic capacitance created between the other end portion of the winding of the power transmission coil and the metal part. This results in a smaller difference between the value of voltage applied via the combined capacitance between the other end portion of the winding of the power transmission coil and the metal part, and the value of voltage input to the other end portion of the winding of the power transmission coil. Meanwhile, the presence of the first adjustment capacitor leads to a smaller difference between the value of voltage applied via the parasitic capacitance created between one end portion of the winding of the power transmission coil and the metal part, and the value of voltage applied across the first reactance circuit. As a result, high voltage induced on the metal part can be reduced.

Preferably, the winding is wound continuously in a layered manner, and the coil unit further includes a second adjustment capacitor connected to an end portion of the winding in the layer of the power transmission coil that is located farthest from the metal part. In this case, the inductance value of the power transmission coil can be improved. Now, if the power transmission coil is constructed as a multi-layer coil, this causes variations to occur in parasitic capacitance between the windings of individual layers and the metal part. According to the present invention, the second adjustment capacitor, which is connected to an end portion of the winding in the layer of the power transmission coil that is located farthest from the metal part, acts to reduce such variations in parasitic capacitance. As a result, the inductance value of the coil can be improved while reducing high voltage induced on the metal part.

Preferably, the power transmission coil is wound continuously in a layered manner such that the other end portion of the winding is located in the layer farthest from the metal part, and the coil unit further includes a second reactance circuit that is connected to the other end portion of the winding of the power transmission coil and forms a resonant circuit together with the power transmission coil. In this case, the inductance value of the power transmission coil can be improved. Further, the first adjustment capacitor is combined with the parasitic capacitance created between the other end portion of the winding of the power transmission coil and the metal part. This results in a smaller difference between the value of voltage applied via the combined capacitance between the other end portion of the winding of the power transmission coil and the metal part, and the value of voltage applied across the second reactance circuit. Meanwhile, the presence of the first adjustment capacitor leads to a smaller difference between the value of voltage applied via the parasitic capacitance created between one end portion of the winding of the power transmission coil and the metal part, and the value of voltage applied across the first reactance circuit. As a result, the inductance value of the coil can be improved while reducing high voltage induced on the metal part.

A coil unit according to the present invention includes a power transmission coil having a winding that is wound continuously in a layered manner, a metal part disposed on the same side as a back side of the power transmission coil, a first adjustment capacitor connected between one end portion of the winding of the power transmission coil and the metal part, and a second adjustment capacitor connected between another end portion of the winding of the power transmission coil and the metal part.

According to the present invention, the coil unit includes the first adjustment capacitor connected between one end portion of the winding of the power transmission coil and the metal part, and the second adjustment capacitor connected between the other end portion of the winding of the power transmission coil and the metal part. Accordingly, the first adjustment capacitor is combined with the parasitic capacitance created between the one end portion of the winding of the power transmission coil and the metal part. This results in a smaller difference between the value of voltage applied via the combined capacitance between the one end portion of the winding of the power transmission coil and the metal part, and the value of voltage input to the one end portion of the winding of the power transmission coil. Meanwhile, the second adjustment capacitor is combined with the parasitic capacitance created between the other end portion of the winding of the power transmission coil and the metal part. This results in a smaller difference between the value of voltage applied via the combined capacitance between the other end portion of the winding of the power transmission coil and the metal part, and the value of voltage input to the other end portion of the winding of the power transmission coil. As a result, high voltage induced on the metal part can be reduced.

Preferably, the first adjustment capacitor and the second adjustment capacitor are connected in series with each other, and connected to the metal part via the midpoint of connection between the first adjustment capacitor and the second adjustment capacitor. In this case, the first adjustment capacitor and the second adjustment capacitor each form a parallel resonant circuit together with the power transmission coil. This eliminates the need for a reactance circuit for causing the power transmission coil to resonate. As a result, the coil unit can be simplified while reducing high voltage induced on the metal part.

Preferably, the coil unit further includes a first reactance circuit that is connected to one end portion of the winding of the power transmission coil and forms a resonant circuit together with the power transmission coil, and a second reactance circuit that is connected to the other end portion of the winding of the power transmission coil and forms a resonant circuit together with the power transmission coil. In this case, the power transmission coil resonates, thus enabling more efficient transmission of power.

A coil unit according to the present invention includes a power transmission coil, a reactance circuit that forms a resonant circuit together with the power transmission coil, a metal part disposed on the same side as a back side of the power transmission coil, and an adjustment capacitor that reduces a difference between a value of voltage applied via a parasitic capacitance created between a winding of the power transmission coil and the metal part, and a value of voltage applied across the reactance circuit.

According to the present invention, the coil unit includes the adjustment capacitor that reduces the difference between the value of voltage applied via a parasitic capacitance created between the winding of the power transmission coil and the metal part, and the value of voltage applied across the reactance circuit. As a result, high voltage induced on the metal part can be reduced.

A wireless power feeding device according to the present invention includes a power feeding coil unit, and the power feeding coil unit is the coil unit mentioned above. The present invention can provide a wireless power feeding device capable of reducing high voltage induced on the metal part.

A wireless power receiving device according to the present invention includes a power receiving coil unit, and the power receiving coil unit is the coil unit mentioned above. The present invention can provide a wireless power receiving device capable of reducing high voltage induced on the metal part.

A wireless power transmission device according to the present invention includes a wireless power feeding device having a power feeding coil unit, and a wireless power receiving device having a power receiving coil unit. At least one of the power feeding coil unit and the power receiving coil unit is the coil unit mentioned above. The present invention can provide a wireless power transmission device capable of reducing high voltage induced on the metal part.

The present invention can provide a coil unit, a wireless power feeding device, a wireless power receiving device, and a wireless power transmission device that are capable of reducing high voltage induced on the metal part.

BRIEF DESCRIPTION OF THE DRAWINGS

FIG. 3a is a plan view of the coil unit according to the first embodiment of the present invention.

FIG. 3b is a cross-sectional view of the coil unit taken along a cutting-plane line A-A in FIG. 3a.

FIG. 5b is a cross-sectional view of the coil unit taken along a cutting-plane line B-B in FIG. 5a.

FIG. 7a is a plan view of the coil unit according to the third embodiment of the present invention.

FIG. 7b is a cross-sectional view of the coil unit taken along a cutting-plane line C-C in FIG. 7a.

FIG. 9a is a plan view of the coil unit according to the fourth embodiment of the present invention.

FIG. 9b is a cross-sectional view of the coil unit taken along a cutting-plane line D-D in FIG. 9a.

DETAILED DESCRIPTION OF EMBODIMENTS

Modes for carrying out the present invention (embodiments) will be described in detail with reference to the drawings. In the following description, identical elements or elements having identical functions are denoted by using the same reference signs, and repetitive description is omitted.

Figure 1:
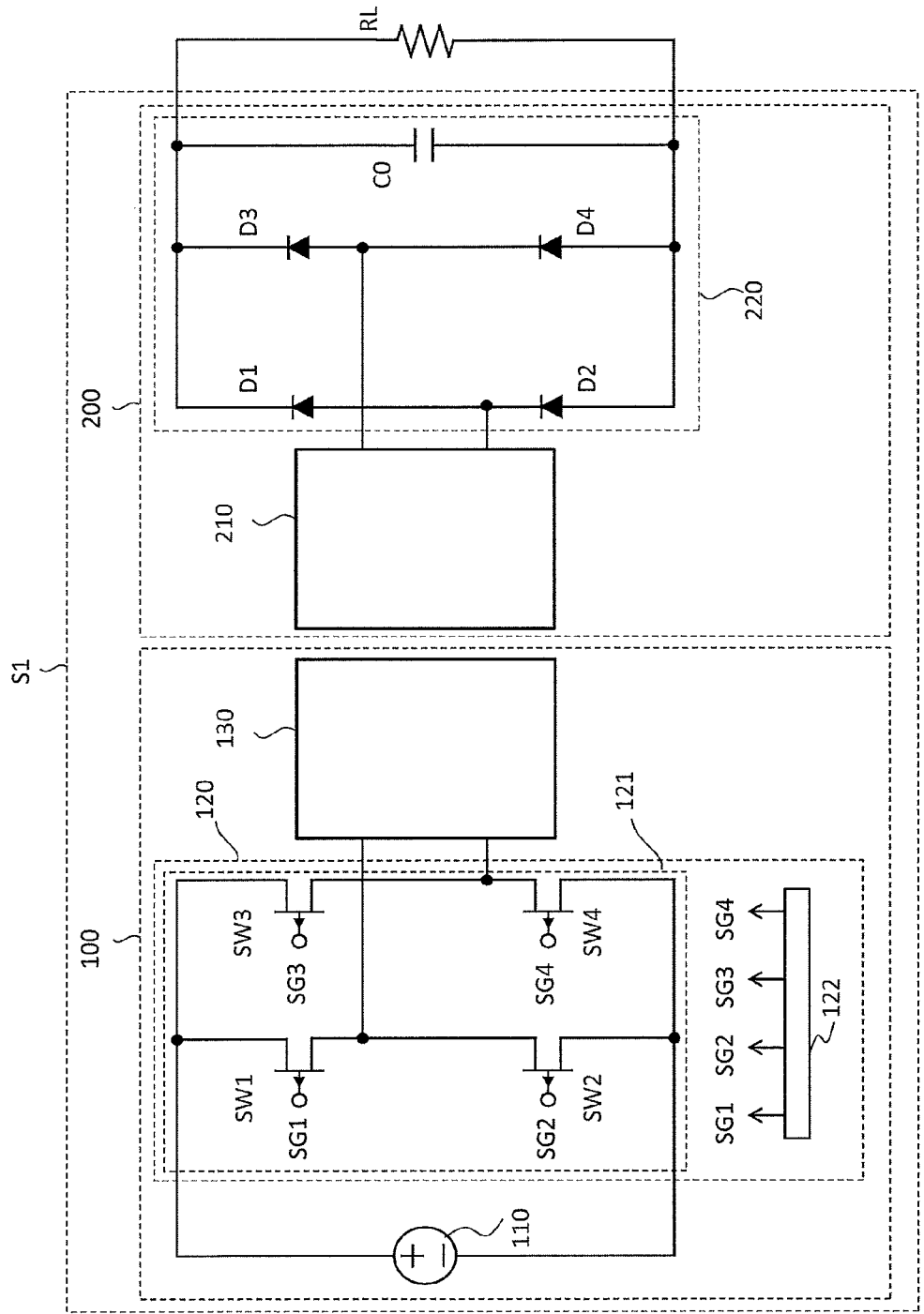
FIG. 1 is a circuit configuration diagram illustrating, together with a load, a wireless power transmission device employing a coil unit according to a preferred embodiment of the present invention.

First, referring to FIG. 1, the general configuration of a wireless power transmission device S1 employing a coil unit according to a preferred embodiment of the present invention will be described. FIG. 1 is a circuit configuration diagram illustrating, together with a load, a wireless power transmission device employing a coil unit according to a preferred embodiment of the present invention. The coil unit according to a preferred embodiment of the present invention may be used for both a power feeding coil unit and a power receiving coil unit in the wireless power transmission device.

The wireless power transmission device S1 has a wireless power feeding device 100, and a wireless power receiving device 200 as illustrated in FIG. 1.

The wireless power feeding device 100 has a power source 110, a power conversion circuit 120, and a power feeding coil unit 130. The power source 110 supplies direct-current (DC) power to the power conversion circuit 120. The power source 110 is not particularly limited as long as the power source 110 outputs DC power. Examples of such a power source include a DC power source obtained through rectification/smoothing of a commercial alternating-current (AC) power source, a secondary battery, a DC power source obtained through photovoltaic power generation, and a switching power supply such as a switching converter.

The power conversion circuit 120 has a power conversion section 121, and a switch driving section 122. The power conversion circuit 120 has the function of converting input DC power supplied from the power source 110 into AC power. More specifically, the power conversion section 121 is constructed of a switching circuit with a plurality of switching elements connected in a bridge configuration. In this embodiment, the power conversion section 121 is a full-bridge circuit using four switching elements SW1 to SW4. Examples of the switching elements SW1 to SW4 include elements such as MOS-FETs (Metal Oxide Semiconductor-Field Effect Transistors) and IGBTs (Insulated Gate Bipolar Transistors). The switching elements SW1 to SW4 are respectively controlled to be On/Off in accordance with SW control signals SG1 to SG4 supplied from the switch driving section 122, thus converting input DC power supplied from the power source 110 into AC power.

The power feeding coil unit 130 has the function of feeding AC power supplied from the power conversion circuit 120 to a power receiving coil unit 210 described later. If the wireless power transmission device S1 according to this embodiment is used as equipment for feeding power to a vehicle such as an electric vehicle, the power feeding coil unit 130 is disposed underground or near the ground.

The wireless power receiving device 200 has the power receiving coil unit 210, and a rectification section 220.

The power receiving coil unit 210 has the function of receiving AC power fed from the power feeding coil unit 130. If the wireless power transmission device S1 according to this embodiment is used as equipment for feeding power to a vehicle such as an electric vehicle, the power receiving coil unit 210 is disposed in a lower part of the vehicle.

The rectification section 220 rectifies the power received by the power receiving coil unit 210, and outputs the rectified power to a load RL. In this embodiment, the rectification section 220 includes a bridge circuit with four diodes (rectifying elements) D1 to D4 connected in a full-bridge configuration, and a smoothing capacitor C0 connected in parallel to this bridge circuit. That is, the rectification section 220 has the function of full-wave rectifying the AC power supplied from the power receiving coil unit 210. The smoothing capacitor C0 smoothes the rectified voltage to produce a DC voltage.

As a result of this configuration, the power feeding coil unit 130 of the wireless power feeding device 100 and the power receiving coil unit 210 of the wireless power receiving device 200 are magnetically coupled when positioned facing each other. Thus, owing to the near-field transmission effect, an induced electromotive force is excited in the power receiving coil unit 210 by the AC power supplied from the power conversion circuit 120 to the power feeding coil unit 130. That is, the above-mentioned configuration provides the wireless power transmission device S1 in which power is transmitted from the wireless power feeding device 100 to the wireless power receiving device 200 in a contactless manner.

The description now proceeds to the configurations of coil units according to preferred embodiments of the present invention that are used as the power feeding coil unit 130 or the power receiving coil unit 210 mentioned above.

First Embodiment

Figure 2:
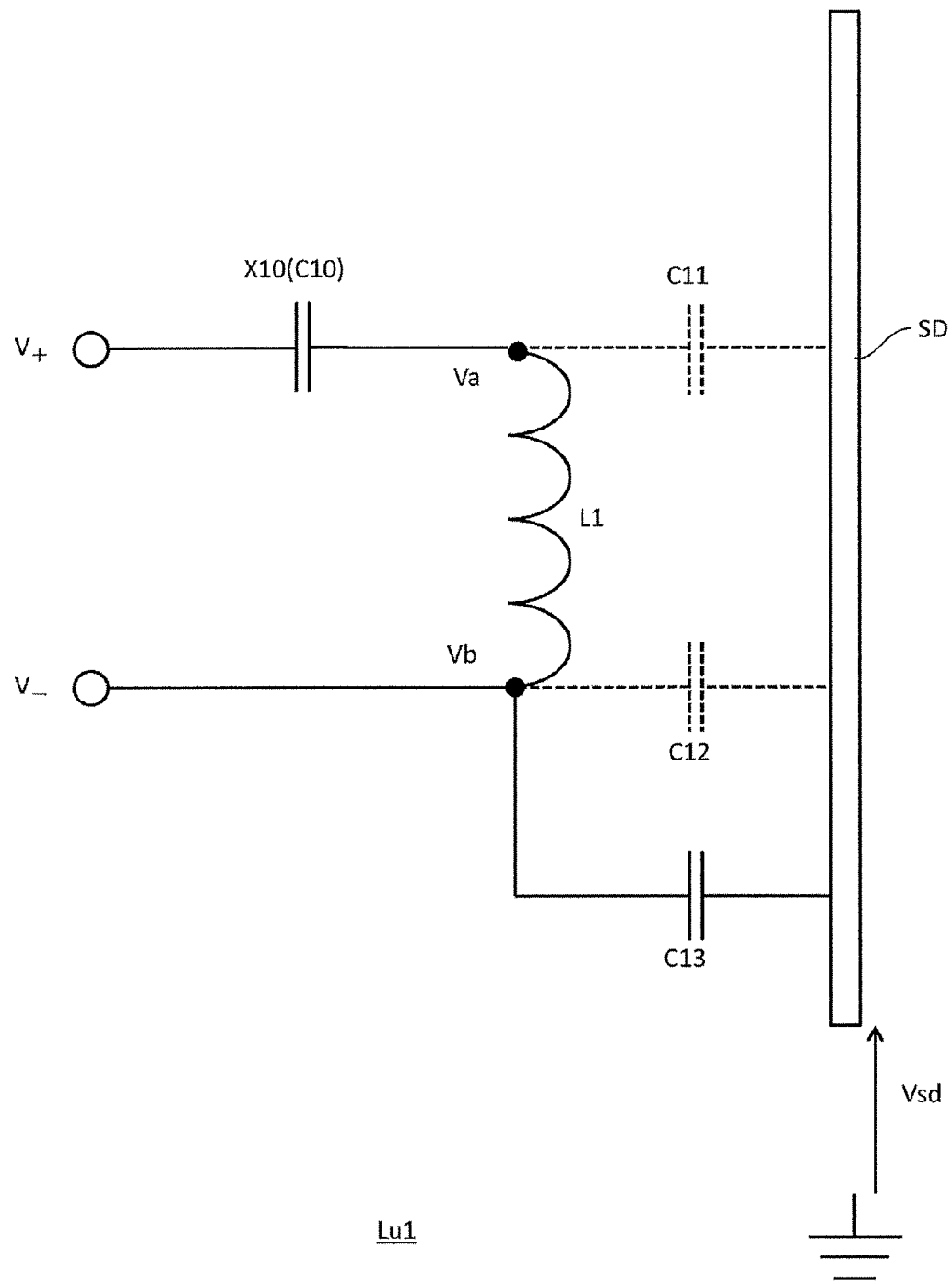
FIG. 2 schematically illustrates the circuit configuration of a coil unit according to a first embodiment of the present invention.

Referring to FIG. 2, a coil unit Lu1 according to a first embodiment of the present invention will be described in detail. FIG. 2 schematically illustrates the circuit configuration of the coil unit according to the first embodiment of the present invention.

As illustrated in FIG. 2, the coil unit Lu1 has a power transmission coil L1, a metal part SD, a first reactance circuit X10, and a first adjustment capacitor C13.

The power transmission coil L1 is constructed of a winding of Litz wire including multiple thin conductor strands twisted together. If the power transmission coil L1 is used as the power feeding coil unit 130 of the wireless power transmission device S1, the power transmission coil L1 functions as a power feeding section, and if the power transmission coil L1 is used as the power receiving coil unit 210 of the wireless power transmission device S1, the power transmission coil L1 functions as a power receiving section.

The metal part SD is made of a conductive material, and acts to absorb electromagnetic waves. That is, the metal part SD serves as a shield member. The metal part SD may be, for example, aluminum, copper, or silver. The metal part SD may be non-magnetic. As for the electrical conductivity of the metal part SD, the higher, the more preferable.

Now, referring to FIG. 3, a more detailed description will be made of the relative placement of the power transmission coil L1 and the metal part SD in the coil unit Lu1 according to the first embodiment. FIG. 3a is a plan view of the coil unit according to the first embodiment of the present invention. FIG. 3b is a cross-sectional view of the coil unit taken along a cutting-plane line A-A in FIG. 3a. For the convenience of explanation, the first reactance circuit X10 and the first adjustment capacitor C13 are not illustrated in FIG. 3b.

As illustrated in FIG. 3a, the power transmission coil L1 is a coil of a planar spiral structure with a substantially circular shape. The number of turns in the power transmission coil L1 is set as appropriate based on various factors, such as the separation distance from the coil that is to be positioned facing the power transmission coil L1 during power transmission, and the desired power transmission efficiency.

As illustrated in FIG. 3b, the metal part SD, which has the outward shape of a substantially rectangular parallelepiped, is disposed on the same side as the back side of the power transmission coil L1. Specifically, if the power transmission coil L1 is used as the power feeding coil unit 130, the metal part SD is located farther from the power receiving coil unit 210 than is the power transmission coil L1 in a direction in which the power feeding coil unit 130 and the power receiving coil unit 210 are positioned facing each other. If the power transmission coil L1 is used as the power receiving coil unit 210, the metal part SD is located farther from the power feeding coil unit 130 than is the power transmission coil L1 in a direction in which the power feeding coil unit 130 and the power receiving coil unit 210 are positioned facing each other. In other words, the metal part SD is disposed on the side opposite to the side of the power transmission coil L1 where power transmission takes place during power transmission. That is, the coil axis of the power transmission coil L1 is orthogonal to the principal surface of the metal part SD. As a result of this configuration, parasitic capacitances C11 and C12 are formed between the power transmission coil L1 and the metal part SD as illustrated in FIG. 2. Since the winding of the power transmission coil L1 is wound in the same plane, the parasitic capacitance C11 and the parasitic capacitance C12 are substantially equal. In the first embodiment, an insulating member IL is provided between the power transmission coil L1 and the metal part SD. In this case, insulation between the power transmission coil L1 and the metal part SD is ensured, thus preventing a short circuit at both ends of the power transmission coil L1. Instead of the insulating member IL, a gap may be provided between the power transmission coil L1 and the metal part SD.

As illustrated in FIG. 2, the first reactance circuit X10 is connected to one end portion of the winding of the power transmission coil L1. That is, the first reactance circuit X10 is connected in series with the power transmission coil L1. The first reactance circuit X10 forms a resonant circuit together with the power transmission coil L1. The first reactance circuit X10 is constructed of a first resonant capacitor C10. Although the first reactance circuit X10 is constructed of the first resonant capacitor C10 in the first embodiment, this is not intended to be limitative. An inductor may be connected in series or parallel with the first resonant capacitor C10.

As illustrated in FIG. 2, the first adjustment capacitor C13 is connected between the other end portion of the winding of the power transmission coil L1, and the metal part SD. That is, the first adjustment capacitor C13 is connected between an end portion of the power transmission coil L1 opposite to the end portion connected with the first reactance circuit X10, and the metal part SD. The first adjustment capacitor C13 is provided for the purpose of reducing the voltage induced on the metal part SD. If the first reactance circuit X10 is connected to only one end portion of the winding of the power transmission coil L1, a potential difference develops between the one end portion of the winding of the power transmission coil L1 and the other end portion of the winding. That is, a resonance voltage Va that develops at one end portion of the winding of the power transmission coil L1 becomes greater than an input voltage Vb input to the other end portion of the winding, resulting in half the difference between the resonance voltage Va and the input voltage Vb being induced on the metal part SD. In this regard, in the first embodiment, the first adjustment capacitor C13 is connected between the other end portion of the winding of the power transmission coil L1 and the metal part SD. Consequently, the parasitic capacitance C12 between the other end portion of the winding of the power transmission coil L1 and the metal part SD, and the first adjustment capacitor C13 are combined. This results in a smaller difference between the value of voltage applied via the combined capacitance between the other end portion of the winding of the power transmission coil L1 and the metal part SD, and the value of the input voltage Vb input to the other end portion of the winding of the power transmission coil L1. Meanwhile, the presence of the first adjustment capacitor C13 leads to a smaller difference between the value of voltage applied via the parasitic capacitance C11 created between one end portion of the winding of the power transmission coil L1 and the metal part SD, and the value of voltage applied across the first reactance circuit X10. The capacitance value of the first adjustment capacitor C13 is preferably set as appropriate based on the value of voltage applied across the first reactance circuit X10, the value of the input voltage Vb, and the values of the parasitic capacitances C11 and C12. Specifically, the capacitance value of the first adjustment capacitor C13 is set such that the ratio between the value of voltage applied across the first reactance circuit X10 and the value of the input voltage Vb, and the ratio between the value of voltage applied via the parasitic capacitance C11 created between one end portion of the winding of the power transmission coil L1 and the metal part SD and the value of voltage applied via the parasitic capacitance C12 created between the other end portion of the winding of the power transmission coil L1 and the metal part SD become equal.

As described above, the coil unit Lu1 according to the first embodiment includes the first reactance circuit X10, which is connected to one end portion of the winding of the power transmission coil L1 and forms a resonant circuit together with the power transmission coil L1, and the first adjustment capacitor C13, which is connected to the other end portion of the winding of the power transmission coil L1 and the metal part SD. Accordingly, the first adjustment capacitor C13 is combined with the parasitic capacitance C12 created between the other end portion of the winding of the power transmission coil L1 and the metal part SD. This results in a smaller difference between the value of voltage applied via the combined capacitance between the other end portion of the winding of the power transmission coil L1 and the metal part SD, and the value of voltage input to the other end portion of the winding of the power transmission coil L1. Meanwhile, the presence of the first adjustment capacitor C13 leads to a smaller difference between the value of voltage applied via the parasitic capacitance C11 created between one end portion of the winding of the power transmission coil L1 and the metal part SD, and the value of voltage applied across the first reactance circuit X10. As a result, high voltage induced on the metal part SD can be reduced.

Second Embodiment

Figure 4:
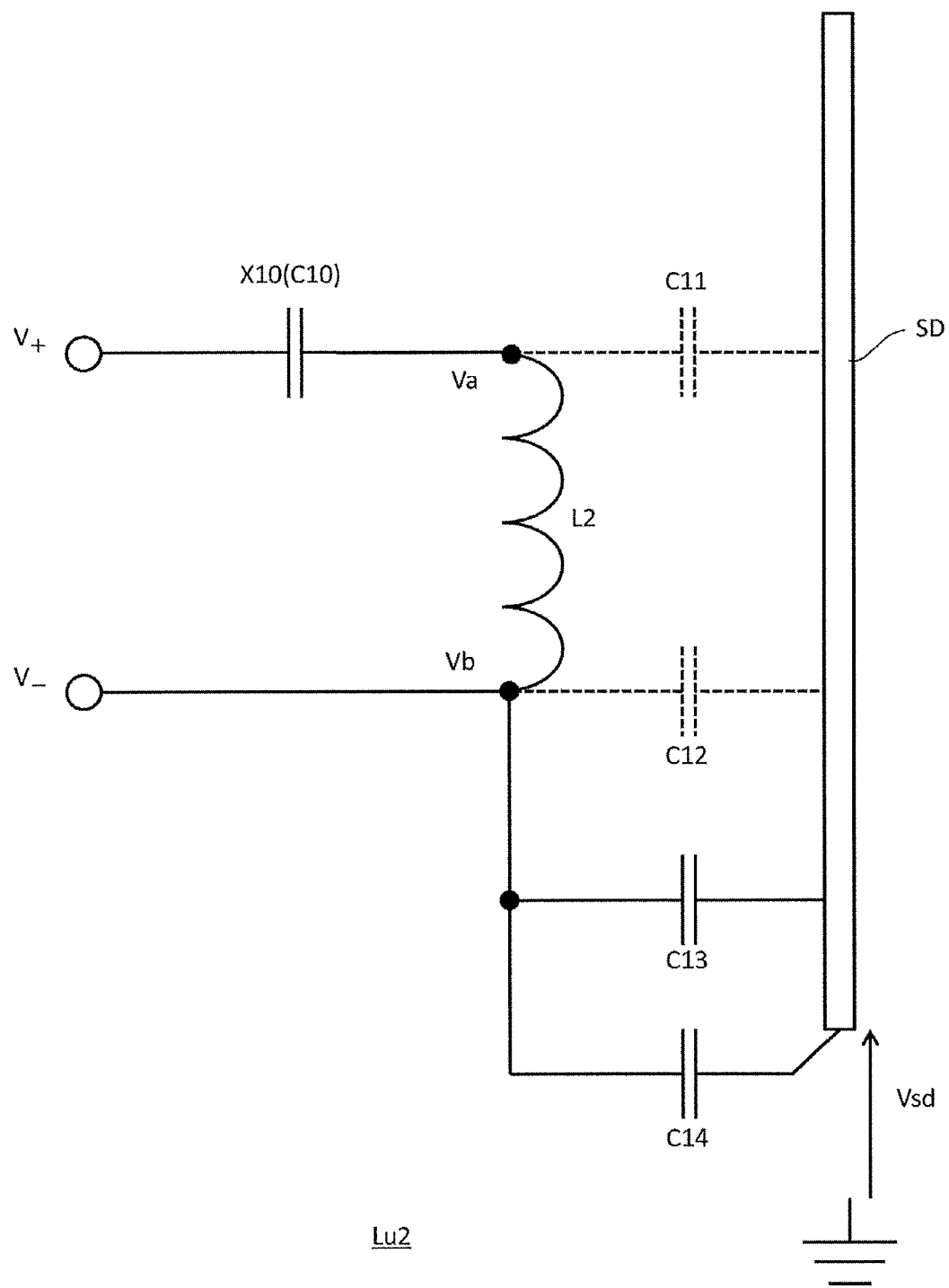
FIG. 4 schematically illustrates the circuit configuration of a coil unit according to a second embodiment of the present invention.
Figure 5A:
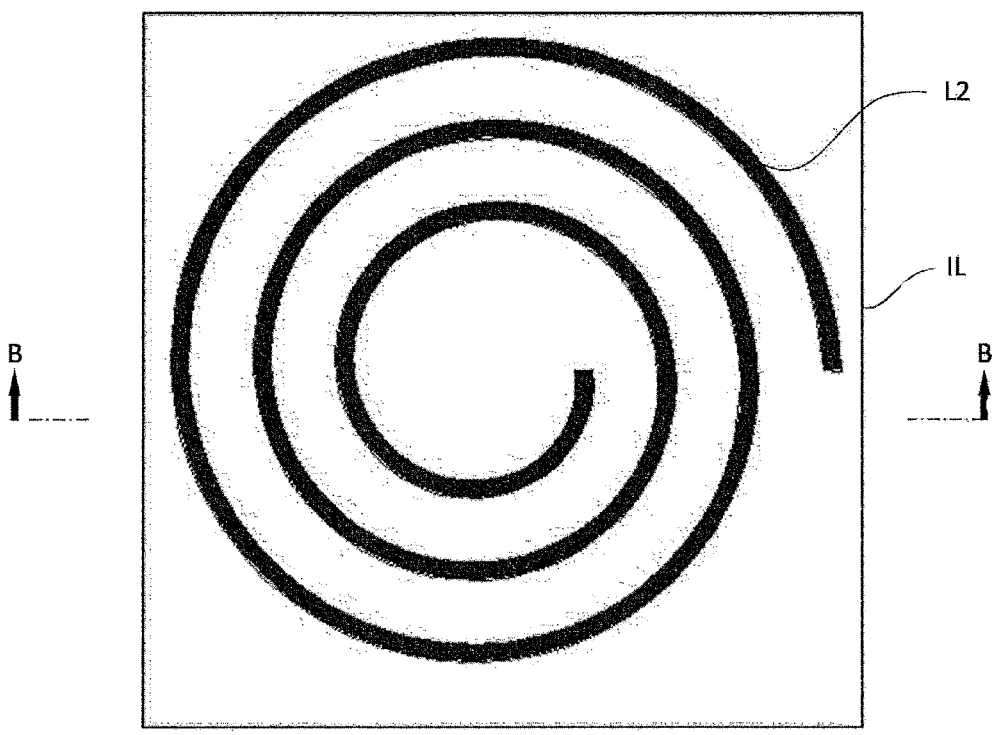
FIG. 5a is a plan view of the coil unit according to the second embodiment of the present invention.
Figure 5B:
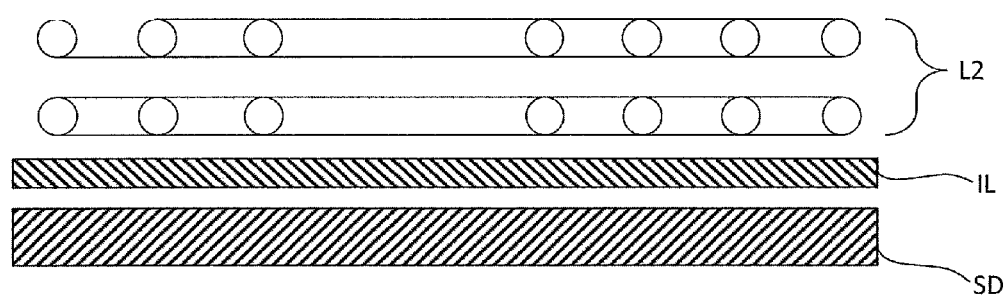

Next, a coil unit Lug according to a second embodiment of the present invention will be described in detail with reference to FIGS. 4 and 5. FIG. 4 schematically illustrates the circuit configuration of the coil unit according to the second embodiment of the present invention. FIG. 5a is a plan view of the coil unit according to the second embodiment of the present invention. FIG. 5b is a cross-sectional view of the coil unit taken along a cutting-plane line B-B in FIG. 5a. For the convenience of explanation, the first reactance circuit X10, the first adjustment capacitor C13, and a second adjustment capacitor C14 are not illustrated in FIG. 5b.

As illustrated in FIG. 4, the coil unit Lu2 has the metal part SD, a power transmission coil L2, the first reactance circuit X10, the first adjustment capacitor C13, and the second adjustment capacitor C14. The metal part SD, the first reactance circuit X10, and the first adjustment capacitor C13 are configured in the same manner as those of the coil unit Lu1 according to the first embodiment. The coil unit Lu2 according to the second embodiment differs from the coil unit Lu1 according to the first embodiment in that the coil unit Lu2 includes the second adjustment capacitor C14, and that the coil unit Lu2 includes the power transmission coil L2 instead of the power transmission coil L1. The following description will mainly focus on differences from the first embodiment.

The power transmission coil L2 is constructed of a winding of Litz wire including multiple thin conductor strands twisted together. If the power transmission coil L2 is used as the power feeding coil unit 130 of the wireless power transmission device S1, the power transmission coil L2 functions as a power feeding section, and if the power transmission coil L2 is used as the power receiving coil unit 210 of the wireless power transmission device S1, the power transmission coil L2 functions as a power receiving section. As illustrated in FIG. 5a, the power transmission coil L2 is a coil of a planar spiral structure with a substantially circular shape. The number of turns in the power transmission coil L2 is set as appropriate based on various factors, such as the separation distance from the coil that is to be positioned facing the power transmission coil L2 during power transmission, and the desired power transmission efficiency. In the second embodiment, the winding of the power transmission coil L2 is wound continuously in a layered manner as illustrated in FIG. 5b. Specifically, the power transmission coil L2 is a coil with a two-layer winding structure in which the winding of the first layer and then the winding of the second layer are wound in the stated order as viewed from the metal part SD. At this time, the end edge of the winding of the first layer and the starting edge of the winding of the second layer are coupled, thus providing the power transmission coil L2 with a winding that is wound continuously in a layered manner. Although the winding of the power transmission coil L2 is wound such that the first layer and the second layer are wound in the stated order as viewed from the metal part SD in the second embodiment, this is not intended to be limitative. The winding may be wound such that the second layer of the power transmission coil L2 is located closer to the metal part SD than is the first layer.

The second adjustment capacitor C14 is connected to an end portion of the winding in the layer of the power transmission coil L2 that is located farthest from the metal part SD. In the second embodiment, the second adjustment capacitor C14 is connected to the other end portion of the winding of the power transmission coil L2 as illustrated in FIG. 4. If the power transmission coil L2 is constructed as a multi-layer coil, this causes a variation to occur between the parasitic capacitances C11 and C12 that are created between the windings of individual layers and the metal part SD. In this regard, in the second embodiment, the second adjustment capacitor C14 acts to reduce the variation between the parasitic capacitance C11 and the parasitic capacitance C12. Specifically, the capacitance value of the second adjustment capacitor C14 is set based on the difference between the parasitic capacitance C11 and the parasitic capacitance C12. In other words, the capacitance value of the second adjustment capacitor C14 is set as appropriate based on the mean distance between the winding and the metal part in a part of the winding from the other end portion to the central portion, relative to the mean distance between the winding and the metal part in a part of the winding from one end portion to the central portion. In the second embodiment, the end portion of the winding in the layer of the power transmission coil L2 that is located farthest from the metal part SD has been described as the other end portion. However, if one end portion of the power transmission coil L2 is the end portion of the winding in the layer located farthest from the metal part SD, the second adjustment capacitor C14 is connected between the one end portion of the winding of the power transmission coil L2 and the metal part SD.

As described above, the coil unit Lu2 according to the second embodiment has a winding wound continuously in a layered manner, and further includes the second adjustment capacitor C14 connected to the end portion of the winding in the layer of the power transmission coil L2 that is located farthest from the metal part SD. Thus, the inductance value of the power transmission coil L2 can be improved. If the power transmission coil L2 is constructed as a multi-layer coil, this causes a variation to occur between the parasitic capacitances C11 and C12 that are created between the windings of individual layers and the metal part SD. According to the present invention, the second adjustment capacitor C14, which is connected to the end portion of the winding in the layer of the power transmission coil L2 that is located farthest from the metal part SD, acts to reduce the variation between the parasitic capacitances C11 and C12. As a result, the inductance value of the coil can be improved while reducing high voltage induced on the metal part SD.

Third Embodiment

Figure 6:
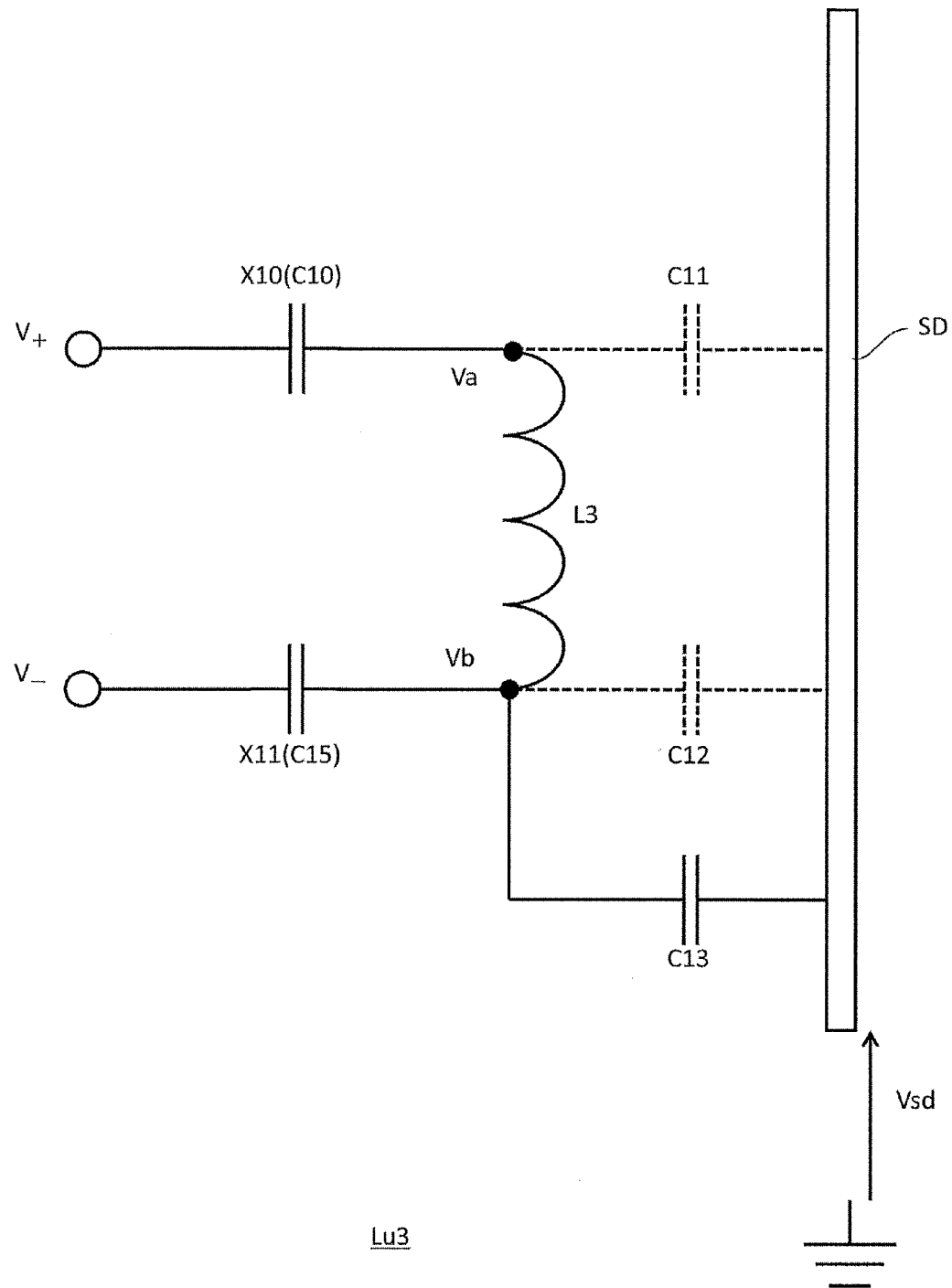
FIG. 6 schematically illustrates the circuit configuration of a coil unit according to a third embodiment of the present invention.

Next, a coil unit Lu3 according to a third embodiment of the present invention will be described in detail with reference to FIGS. 6 and 7. FIG. 6 schematically illustrates the circuit configuration of the coil unit according to the third embodiment of the present invention. FIG. 7a is a plan view of the coil unit according to the third embodiment of the present invention. FIG. 7b is a cross-sectional view of the coil unit taken along a cutting-plane line C-C in FIG. 7a. For the convenience of explanation, the first reactance circuit X10, a second reactance circuit X11, and the first adjustment capacitor C13 are not illustrated in FIG. 7b.

As illustrated in FIG. 6, the coil unit Lu3 has the metal part SD, a power transmission coil L3, the first reactance circuit X10, the second reactance circuit X11, and the first adjustment capacitor C13. The metal part SD and the first reactance circuit X10 are configured in the same manner as those of the coil unit Lu1 according to the first embodiment. The coil unit Lu3 according to the third embodiment differs from the coil unit Lu1 according to the first embodiment in the following respects: the coil unit Lu3 includes the second reactance circuit X11, the coil unit Lu3 includes the power transmission coil L3 instead of the power transmission coil L1, and the function of the first adjustment capacitor C13. The following description will mainly focus on differences from the first embodiment.

The power transmission coil L3 is constructed of a winding of Litz wire including multiple thin conductor strands twisted together. If the power transmission coil L3 is used as the power feeding coil unit 130 of the wireless power transmission device S1, the power transmission coil L3 functions as a power feeding section, and if the power transmission coil L3 is used as the power receiving coil unit 210 of the wireless power transmission device S1, the power transmission coil L3 functions as a power receiving section. As illustrated in FIG. 7a, the power transmission coil L3 is a coil of a planar spiral structure with a substantially circular shape. The number of turns in the power transmission coil L3 is set as appropriate based on various factors, such as the separation distance from the coil that is to be positioned facing the power transmission coil L3 during power transmission, and the desired power transmission efficiency. In the third embodiment, the winding of the power transmission coil L3 is wound continuously in a layered manner as illustrated in FIG. 7b. Specifically, the power transmission coil L3 is a coil with a two-layer winding structure in which the winding of the first layer and then the winding of the second layer are wound in the stated order as viewed from the metal part SD. At this time, the end edge of the winding of the first layer and the starting edge of the winding of the second layer are coupled, thus providing the power transmission coil L3 with a winding that is wound continuously in a layered manner. Although the winding of the power transmission coil L3 is wound such that the winding of the first layer and the winding of the second layer are wound in the stated order as viewed from the metal part SD in the third embodiment, this is not intended to be limitative. The winding may be wound such that the second layer of the power transmission coil L2 is located closer to the metal part SD than is the first layer. Further, in the third embodiment, the power transmission coil L3 is wound continuously in a layered manner such that one end portion of the winding of the power transmission coil L3 is located in the layer closest to the metal part SD, and the other end portion of the winding is located in the layer farthest from the metal part SD.

As illustrated in FIG. 6, the second reactance circuit X11 is connected to the other end portion of the winding of the power transmission coil L3. That is, the second reactance circuit X11 is connected in series with the power transmission coil L3. Further, the second reactance circuit X11 forms a resonant circuit together with the power transmission coil L3. The second reactance circuit X11 is constructed of a second resonant capacitor C15. Although the second reactance circuit X11 is constructed of the second resonant capacitor C15 in the third embodiment, this is not intended to be limitative. An inductor may be connected in series or parallel with the second resonant capacitor C15. The reactance value of the first reactance circuit X10 and the reactance value of the second reactance circuit X11 are preferably the same. In this case, a resonance voltage Va that develops at one end portion of the winding of the power transmission coil L3, and a resonance voltage Vb (input voltage Vb) that develops at the other end portion of the winding become equal.

The first adjustment capacitor C13 is connected to the end portion (the other end portion) of the winding in the layer of the power transmission coil L3 that is located farthest from the metal part SD. The first adjustment capacitor C13 is provided for the purpose of reducing voltage that is induced on the metal part SD from the power transmission coil L3 via a parasitic capacitance. Since one end portion of the winding of the power transmission coil L3 is connected with the first reactance circuit X10, and the other end portion of the winding is connected with the second reactance circuit X11 as described above, the resonance voltage Va and the resonance voltage Vb are equal. If the power transmission coil L3 is constructed as a multi-layer coil, this causes a variation to occur between the parasitic capacitances C11 and C12 that are created between the windings of individual layers and the metal part SD. In this regard, in the third embodiment, the first adjustment capacitor C13 is connected between the other end portion of the winding of the power transmission coil L3 and the metal part SD. Consequently, the parasitic capacitance C12 between the other end portion of the winding of the power transmission coil L3 and the metal part SD, and the first adjustment capacitor C13 are combined. This results in a smaller difference between the value of voltage applied via the combined capacitance between the other end portion of the winding of the power transmission coil L3 and the metal part SD, and the value of voltage applied across the second reactance circuit X11. Meanwhile, the presence of the first adjustment capacitor C13 leads to a smaller difference between the value of voltage applied via the parasitic capacitance C11 created between one end portion of the winding of the power transmission coil L3 and the metal part SD, and the value of voltage applied across the first reactance circuit X10. The capacitance value of the first adjustment capacitor C13 is preferably set as appropriate based on the value of voltage applied across the first reactance circuit X10, the value of voltage applied across the second reactance circuit X11, and the values of the parasitic capacitances C11 and C12. Specifically, the capacitance value of the first adjustment capacitor C13 is set such that the ratio between the value of voltage applied across the first reactance circuit X10 and the value of voltage applied across the second reactance circuit X11, and the ratio between the value of voltage applied via the parasitic capacitance C11 created between one end portion of the winding of the power transmission coil L3 and the metal part SD and the value of voltage applied via the parasitic capacitance C12 created between the other end portion of the winding of the power transmission coil L3 and the metal part SD become equal.

As described above, in the coil unit Lu3 according to the third embodiment, the power transmission coil L3 is wound continuously in a layered manner such that the other end portion of the winding of the power transmission coil L3 is located in the layer farthest from the metal part SD, and the power transmission coil L3 further includes the second reactance circuit X11, which is connected to the other end portion of the winding of the power transmission coil L3 and forms a resonant circuit together with the power transmission coil L3. The inductance value of the power transmission coil L3 can be thus improved. Further, the first adjustment capacitor C13 is combined with the parasitic capacitance C12 created between the other end portion of the winding of the power transmission coil L3 and the metal part SD. This results in a smaller difference between the value of voltage applied via the combined capacitance between the other end portion of the winding of the power transmission coil L3 and the metal part SD, and the value of voltage applied across the second reactance circuit X11. Meanwhile, the presence of the first adjustment capacitor C13 leads to a smaller difference between the value of voltage applied via the parasitic capacitance C11 created between one end portion of the winding of the power transmission coil L3 and the metal part SD, and the value of voltage applied across the first reactance circuit X10. As a result, the inductance value of the coil can be improved while reducing high voltage induced on the metal part SD.

Fourth Embodiment

Figure 8:
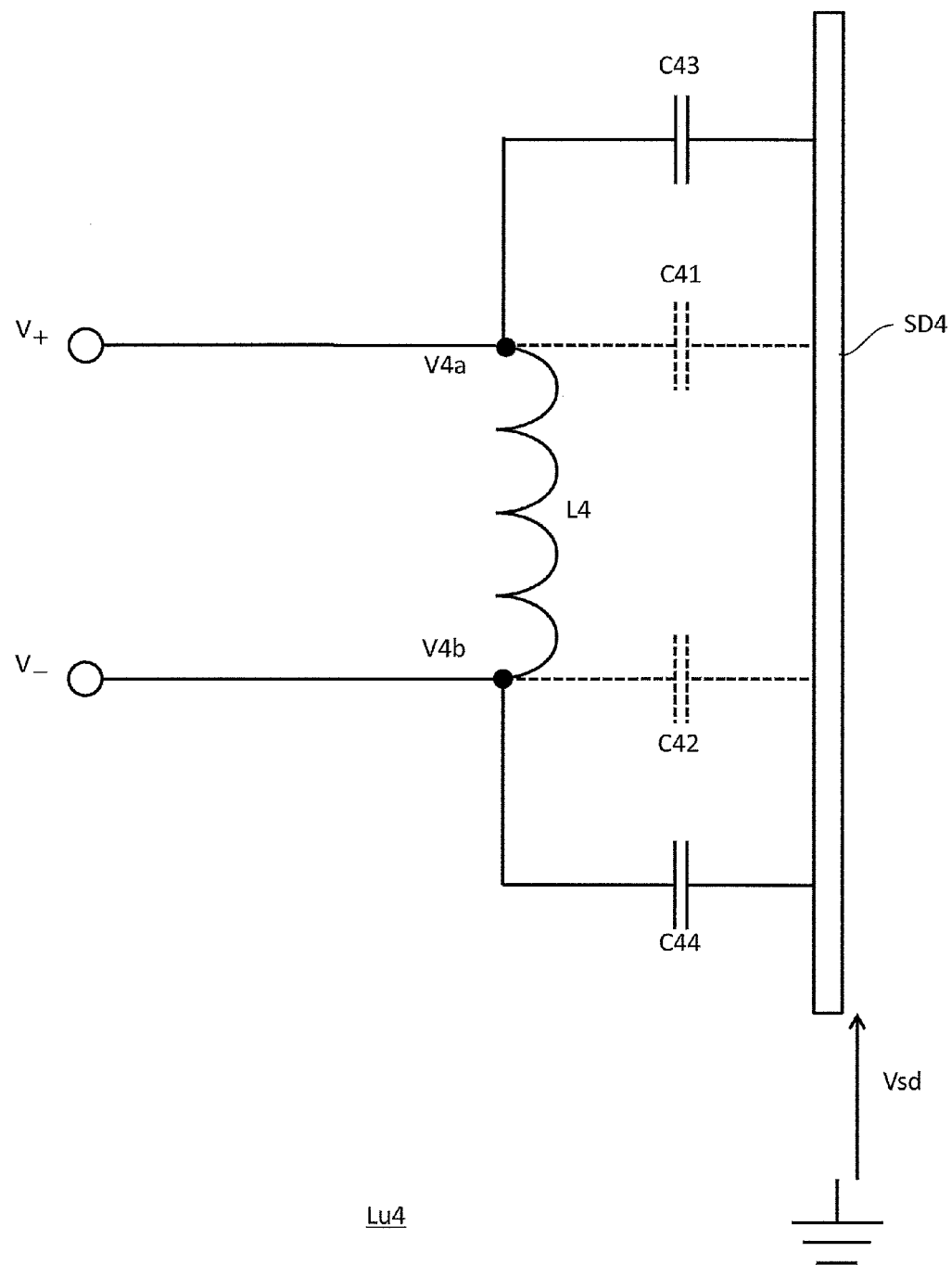
FIG. 8 schematically illustrates the circuit configuration of a coil unit according to a fourth embodiment of the present invention.

Next, a coil unit Lu4 according to a fourth embodiment of the present invention will be described in detail with reference to FIG. 8. FIG. 8 schematically illustrates the circuit configuration of a coil unit according to a fourth embodiment of the present invention.

As illustrated in FIG. 8, the coil unit Lu4 has a power transmission coil L4, a metal part SD4, a first adjustment capacitor C43, and a second adjustment capacitor C44.

The power transmission coil L4 is constructed of a winding of Litz wire including multiple thin conductor strands twisted together. If the power transmission coil L4 is used as the power feeding coil unit 130 of the wireless power transmission device S1, the power transmission coil L4 functions as a power feeding section, and if the power transmission coil L4 is used as the power receiving coil unit 210 of the wireless power transmission device S1, the power transmission coil L4 functions as a power receiving section.

The metal part SD4 is made of a conductive material, and acts to absorb electromagnetic waves. That is, the metal part SD4 serves as a shield member. The metal part SD4 may be, for example, aluminum, copper, or silver. The metal part SD4 may be non-magnetic. As for the electrical conductivity of the metal part SD4, the higher, the more preferable.

Now, referring to FIG. 9, a more detailed description will be made of the relative placement of the power transmission coil L4 and the metal part SD4 in the coil unit Lu4 according to the fourth embodiment. FIG. 9a is a plan view of the coil unit according to the fourth embodiment of the present invention. FIG. 9b is a cross-sectional view of the coil unit taken along a cutting-plane line D-D in FIG. 9a. For the convenience of explanation, the first adjustment capacitor C43 and the second adjustment capacitor C44 are not illustrated in FIG. 9b.

As illustrated in FIG. 9a, the power transmission coil L4 is a coil of a planar spiral structure with a substantially circular shape. The number of turns in the power transmission coil L4 is set as appropriate based on various factors, such as the separation distance from the coil that is to be positioned facing the power transmission coil L4 during power transmission, and the desired power transmission efficiency.

As illustrated in FIG. 9b, the metal part SD4, which has the outward shape of a substantially rectangular parallelepiped, is disposed on the same side as the back side of the power transmission coil L4. Specifically, if the power transmission coil L4 is used as the power feeding coil unit 130, the metal part SD4 is located farther from the power receiving coil unit 210 than is the power transmission coil L4 in a direction in which the power feeding coil unit 130 and the power receiving coil unit 210 are positioned facing each other. If the power transmission coil L4 is used as the power receiving coil unit 210, the metal part SD4 is located farther from the power feeding coil unit 130 than is the power transmission coil L4 in a direction in which the power feeding coil unit 130 and the power receiving coil unit 210 are positioned facing each other. In other words, the metal part SD4 is disposed on the side opposite to the side of the power transmission coil L4 where power transmission takes place during power transmission. That is, the coil axis of the power transmission coil L4 is orthogonal to the principal surface of the metal part SD4. As a result of this configuration, parasitic capacitances C41 and C42 are formed between the power transmission coil L4 and the metal part SD4 as illustrated in FIG. 8. In the fourth embodiment, an insulating member IL4 is provided between the power transmission coil L4 and the metal part SD4. In this case, insulation between the power transmission coil L4 and the metal part SD4 is ensured, thus preventing a short circuit at both ends of the power transmission coil L4. Instead of the insulating member IL4, a gap may be provided between the power transmission coil L4 and the metal part SD4.

In the fourth embodiment, the winding of the power transmission coil L4 is wound continuously in a layered manner as illustrated in FIG. 9b. Specifically, the power transmission coil L4 is a coil with a two-layer winding structure in which the winding of the first layer and then the winding of the second layer are wound in the stated order as viewed from the metal part SD4. At this time, the end edge of the winding of the first layer and the starting edge of the winding of the second layer are coupled, thus providing the power transmission coil L4 with a winding that is wound continuously in a layered manner. Although the winding of the power transmission coil L4 is wound such that the first layer and the second layer are wound in the stated order as viewed from the metal part SD4 in the fourth embodiment, this is not intended to be limitative. The winding may be wound such that the second layer of the power transmission coil L4 is located closer to the metal part SD4 than is the first layer.

As illustrated in FIG. 8, the first adjustment capacitor C43 is connected between one end portion of the winding of the power transmission coil L4, and the metal part SD4. The first adjustment capacitor C13 is provided for the purpose of reducing the voltage induced on the metal part SD.

As illustrated in FIG. 8, the second adjustment capacitor C44 is connected between the other end portion of the winding of the power transmission coil L4, and the metal part SD4. The second adjustment capacitor C43 is provided for the purpose of reducing the voltage induced on the metal part SD.

In the fourth embodiment, an input voltage V4a and an input voltage V4b that are applied to the power transmission coil L4 are equal. If the power transmission coil L4 is constructed as a multi-layer coil, this causes a variation to occur between the parasitic capacitances C41 and C42 that are created between the windings of individual layers and the metal part SD4. In this regard, in the fourth embodiment, the first adjustment capacitor C43 is connected between one end portion of the winding of the power transmission coil L4 and the metal part SD4. Consequently, the parasitic capacitance C41 between the one end portion of the winding of the power transmission coil L4 and the metal part SD4, and the first adjustment capacitor C43 are combined. This results in a smaller difference between the value of voltage applied via the combined capacitance between the one end portion of the winding of the power transmission coil L4 and the metal part SD4, and the value of the input voltage V4a. Meanwhile, the second adjustment capacitor C44 is connected between the other end portion of the winding of the power transmission coil L4 and the metal part SD4. Consequently, the parasitic capacitance C42 between the other end portion of the winding of the power transmission coil L4 and the metal part SD4, and the second adjustment capacitor C44 are combined. This results in a smaller difference between the value of voltage applied via the combined capacitance between the other end portion of the winding of the power transmission coil L4 and the metal part SD4, and the value of the input voltage V4b. The respective capacitance values of the first and second adjustment capacitors C43 and C44 are preferably set as appropriate based on the values of the input voltage V4a and the input voltage V4b, and the values of the parasitic capacitances C41 and C42. Specifically, the respective capacitance values of the first and second adjustment capacitors C43 and C44 are set such that the ratio between the value of the input voltage V4a and the value of the input voltage V4b, and the ratio between the value of voltage applied via the parasitic capacitance C41 created between one end portion of the winding of the power transmission coil L4 and the metal part SD and the value of voltage applied via the parasitic capacitance C42 created between the other end portion of the winding of the power transmission coil L4 and the metal part SD become equal. More preferably, the respective capacitance values of the first and second adjustment capacitors C43 and C44 are equal to each other, and set to equal to or greater than 10 times the maximum values of the parasitic capacitances C41 and C42. In this case, the apparent variation between the parasitic capacitances C41 and C42 becomes relatively very small, allowing the variation between the capacitance values to be ignored. Consequently, the degree of influence of variations occurring between the windings of individual layers of the power transmission coil L4 and the metal part SD4 is kept within 10%, thus reducing high voltage induced on the metal part SD4.

As described above, the coil unit Lu4 according to the fourth embodiment includes the first adjustment capacitor C43 connected to one end portion of the winding of the power transmission coil L4, and the second adjustment capacitor C44 connected to the other end portion of the winding of the power transmission coil L4. Accordingly, the first adjustment capacitor C43 is combined with the parasitic capacitance C41 created between one end portion of the winding of the power transmission coil L4 and the metal part SD4. This results in a smaller difference between the value of voltage applied via the combined capacitance between the one end portion of the winding of the power transmission coil L4 and the metal part SD4, and the value of the input voltage V4a. Further, the second adjustment capacitor C44 is combined with the parasitic capacitance C42 created between the other end portion of the winding of the power transmission coil L4 and the metal part SD4. This results in a smaller difference between the value of voltage applied via the combined capacitance between the other end portion of the winding of the power transmission coil L4 and the metal part SD4, and the value of the input voltage V4b. As a result, high voltage induced on the metal part SD4 can be reduced.

Fifth Embodiment

Figure 10:
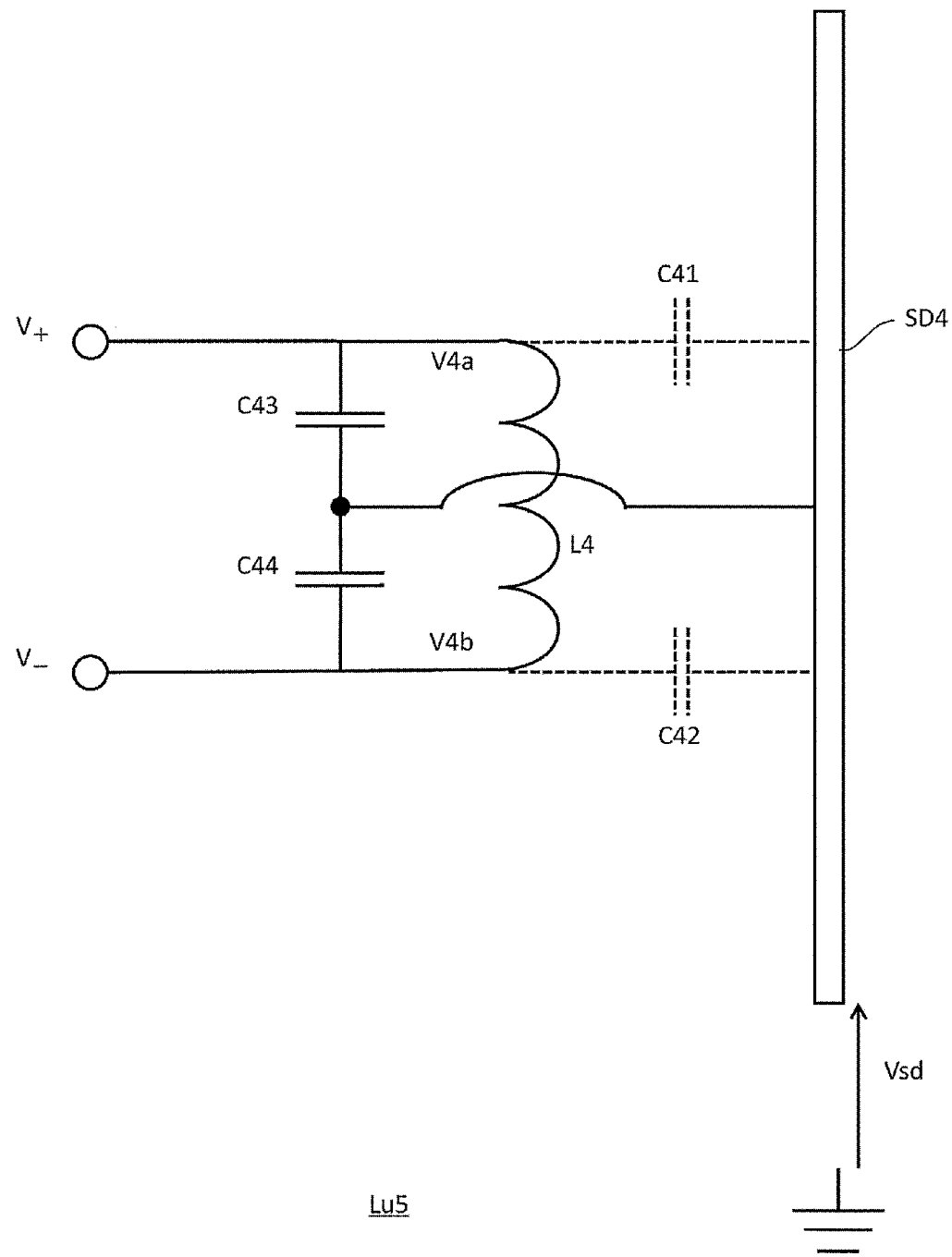
FIG. 10 schematically illustrates the circuit configuration of a coil unit according to a fifth embodiment of the present invention.

Next, a coil unit Lu5 according to a fifth embodiment of the present invention will be described in detail with reference to FIG. 10. FIG. 10 schematically illustrates the circuit configuration of the coil unit according to the fifth embodiment of the present invention.

As illustrated in FIG. 10, the coil unit Lu5 has the metal part SD4, the power transmission coil L4, the first adjustment capacitor C43, and the second adjustment capacitor C44. The metal part SD4 and the power transmission coil L4 are configured in the same manner as those of the coil unit Lu4 according to the first embodiment. The coil unit Lu5 according to the fifth embodiment differs from the coil unit Lu4 according to the fourth embodiment in the positions where the first adjustment capacitor C43 and the second adjustment capacitor C44 are connected. The following description will mainly focus on differences from the fourth embodiment.

The first adjustment capacitor C43 and the second adjustment capacitor C44 are connected in series with each other. Specifically, the first adjustment capacitor C43 is connected between one end portion of the winding of the power transmission coil L4 and the second adjustment capacitor C44, and the second adjustment capacitor C44 is connected between the other end portion of the winding of the power transmission coil L4 and the first adjustment capacitor C43. Further, the midpoint of the first adjustment capacitor C43 and the second adjustment capacitor C44 is connected to the metal part SD4. In the fifth embodiment, the first adjustment capacitor C43 and the second adjustment capacitor C44 are connected in series with each other, and each of these capacitors thus functions as a capacitor used for parallel resonance that forms a parallel resonant circuit together with the power transmission coil L5. That is, each of the first adjustment capacitor C43 and the second adjustment capacitor C44 combines the function of an adjustment capacitor and the function of a resonant capacitor, and the capacitance value of each of the first adjustment capacitor C43 and the second adjustment capacitor C44 is set to a value that allows for resonance with the power transmission coil L4.

As described above, in the coil unit Lu5 according to the fifth embodiment, the first adjustment capacitor and the second adjustment capacitor are connected in series with each other, and connected to the metal part via the midpoint of connection between the first adjustment capacitor and the second adjustment capacitor. In this case, the first adjustment capacitor and the second adjustment capacitor each form a parallel resonant circuit together with the power transmission coil. Thus, no reactance circuit for causing the power transmission coil to resonate is necessary. As a result, the coil unit can be simplified while reducing high voltage induced on the metal part.

Sixth Embodiment

Figure 11:
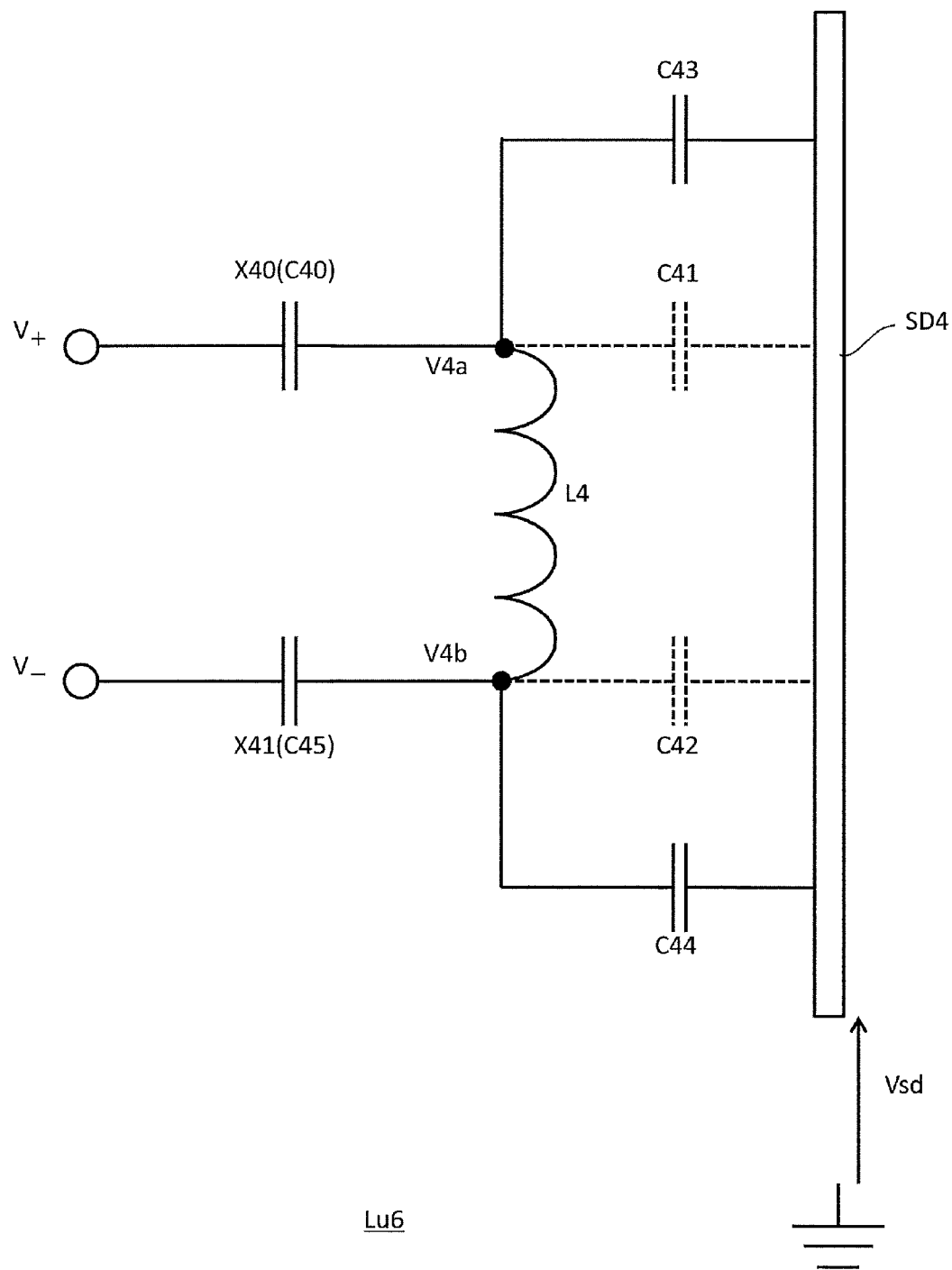
FIG. 11 schematically illustrates the circuit configuration of a coil unit according to a sixth embodiment of the present invention.

Next, a coil unit Lu6 according to a sixth embodiment of the present invention will be described in detail with reference to FIG. 11. FIG. 11 schematically illustrates the circuit configuration of the coil unit according to the sixth embodiment of the present invention.

As illustrated in FIG. 11, the coil unit Lu6 has the metal part SD4, the power transmission coil L4, a first reactance circuit X40, a second reactance circuit X41, the first adjustment capacitor C43, and the second adjustment capacitor C44. The metal part SD, the first adjustment capacitor C43, and the second adjustment capacitor C44 are configured in the same manner as those of the coil unit Lu4 according to the fourth embodiment. The coil unit Lu6 according to the sixth embodiment differs from the coil unit Lu4 according to the fourth embodiment in that the coil unit Lu6 includes the first reactance circuit X40 and the second reactance circuit X41. The following description will mainly focus on differences from the fourth embodiment.

As illustrated in FIG. 11, the first reactance circuit X40 is connected to one end portion of the winding of the power transmission coil L4. That is, the first reactance circuit X40 is connected in series with the power transmission coil L4. Further, the first reactance circuit X40 forms a resonant circuit together with the power transmission coil L4. The first reactance circuit X40 is constructed of a first resonant capacitor C40. Although the first reactance circuit X40 is constructed of the first resonant capacitor C40 in the sixth embodiment, this is not intended to be limitative. An inductor may be connected in series or parallel with the first resonant capacitor C40.

As illustrated in FIG. 11, the second reactance circuit X41 is connected to the other end portion of the winding of the power transmission coil L4. That is, the second reactance circuit X41 is connected in series with the power transmission coil L4. Further, the second reactance circuit X41 forms a resonant circuit together with the power transmission coil L4. The second reactance circuit X41 is constructed of a second resonant capacitor C45. Although the second reactance circuit X41 is constructed of the second resonant capacitor C45 in the sixth embodiment, this is not intended to be limitative. An inductor may be connected in series or parallel with the second resonant capacitor C45. The reactance value of the first reactance circuit X40 and the reactance value of the second reactance circuit X41 are preferably the same. In this case, the resonance voltage V4a that develops at one end portion of the winding of the power transmission coil L4, and the resonance voltage V4b that develops at the other end portion of the winding become equal.

In the sixth embodiment, one end portion of the winding of the power transmission coil L4 is connected with the first reactance circuit X40, and the other end portion of the winding is connected with the second reactance circuit X41. Thus, the resonance voltage V4a and the resonance voltage V4b become equal. If the power transmission coil L4 is constructed as a multi-layer coil, this causes a variation to occur between the parasitic capacitances C41 and C42 that are created between the windings of individual layers and the metal part SD4. In this regard, in the sixth embodiment, the first adjustment capacitor C43 is connected between one end portion of the winding of the power transmission coil L4 and the metal part SD4. Consequently, the parasitic capacitance C41 between the one end portion of the winding of the power transmission coil L4 and the metal part SD4, and the first adjustment capacitor C43 are combined. This results in a smaller difference between the value of voltage applied via the combined capacitance between the one end portion of the winding of the power transmission coil L4 and the metal part SD4, and the value of voltage applied across the first reactance circuit X40. Meanwhile, the second adjustment capacitor C44 is connected between the other end portion of the winding of the power transmission coil L4 and the metal part SD4. Consequently, the parasitic capacitance C42 between the other end portion of the winding of the power transmission coil L4 and the metal part SD4, and the second adjustment capacitor C44 are combined. This results in a smaller difference between the value of voltage applied via the combined capacitance between the other end portion of the winding of the power transmission coil L4 and the metal part SD4, and the value of voltage applied across the second reactance circuit X41. The respective capacitance values of the first adjustment capacitor C43 and the second adjustment capacitor C44 are preferably set as appropriate based on the value of voltage applied across the first reactance circuit X40, the value of voltage applied across the second reactance circuit X41, and the values of the parasitic capacitances C41 and C42. Specifically, the respective capacitance values of the first adjustment capacitor C43 and the second adjustment capacitor C44 are set such that the ratio between the value of voltage applied across the first reactance circuit X40 and the value of voltage applied across the second reactance circuit X41, and the ratio between the value of voltage applied via the parasitic capacitance C41 created between one end portion of the winding of the power transmission coil L4 and the metal part SD and the value of voltage applied via the parasitic capacitance C42 created between the other end portion of the winding of the power transmission coil L6 and the metal part SD become equal. More preferably, the respective capacitance values of the first and second adjustment capacitors C43 and C44 are equal to each other, and set to equal to or greater than 10 times the maximum values of the parasitic capacitances C41 and C42. In this case, the apparent variation between the parasitic capacitances C41 and C42 becomes relatively very small, allowing the variation between the capacitance values to be ignored. Consequently, the degree of influence of variations occurring between the windings of individual layers of the power transmission coil L4 and the metal part SD4 is kept within 10%, thus reducing high voltage induced on the metal part SD4.

As described above, the coil unit Lu6 according to the sixth embodiment includes the first reactance circuit X40, which is connected to one end portion of the winding of the power transmission coil and forms a resonant circuit together with the power transmission coil, and the second reactance circuit X41, which is connected to the other end portion of the winding of the power transmission coil and forms a resonant circuit together with the power transmission coil. This allows the power transmission coil to resonate, thus enabling more efficient transmission of power.

REFERENCE SIGNS LIST 100 wireless power feeding device, 110 power source, 120 power conversion circuit, 121 power conversion section, 122 switch driving section, 130 power feeding coil unit, 200 wireless power receiving device, 210 power receiving coil unit, 220 rectification section, C0 smoothing capacitor, C10, C40 first resonant capacitor, C11, C12, C41, C42 parasitic capacitance, C13, C43 first adjustment capacitor, C14, C44 second adjustment capacitor, C15, C45 second resonant capacitor, D1 to D4 diode, IL, IL4 insulating member, L1 to L4 power transmission coil, Lu1 to Lu6 coil unit, RL load, S1 wireless power transmission device, SD, SD4 metal part, SG1 to SG4 SW control signal, SW1 to SW4 switching element, X10, X40 first reactance circuit, X11, X41 second reactance circuit.

What is claimed is:

1. A coil unit comprising:
   a power transmission coil;
   a first reactance circuit that is connected to one end portion of a winding of the power transmission coil, and forms a resonant circuit together with the power transmission coil;
   a metal part disposed on a same side as a back side of the power transmission coil; and
   a first adjustment capacitor connected between another end portion of the winding of the power transmission coil and the metal part, the first adjustment capacitor having a capacitance other than any parasitic capacitances generated by and between the winding of the power transmission coil and the metal part.

2. The coil unit according to claim 1,
   wherein the winding of the power transmission coil is wound continuously in a layered manner, and
   wherein the coil unit further comprises a second adjustment capacitor, the second adjustment capacitor being connected to an end portion of the winding in a layer of the power transmission coil that is farthest from the metal part.

3. The coil unit according to claim 1,
   wherein the power transmission coil is wound continuously in a layered manner such that the other end portion of the winding is located in a layer that is farthest from the metal part, and
   wherein the coil unit further comprises a second reactance circuit, the second reactance circuit being connected to the other end portion of the winding of the power transmission coil and forming a resonant circuit together with the power transmission coil.

4. A coil unit comprising:

a power transmission coil having a winding that is wound continuously in a layered manner;

a metal part disposed on a same side as a back side of the power transmission coil;

a first adjustment capacitor connected between one end portion of the winding of the power transmission coil, and the metal part; and a second adjustment capacitor connected between another end portion of the winding of the power transmission coil, and the metal part, the first adjustment capacitor having a capacitance other than any parasitic capacitances generated by and between the winding of the power transmission coil and the metal part, the second adjustment capacitor having a capacitance other than any parasitic capacitances generated by and between the winding of the power transmission coil and the metal part.

5. The coil unit according to claim 4, wherein the first adjustment capacitor and the second adjustment capacitor are connected in series with each other, and wherein the first adjustment capacitor and the second adjustment capacitor are connected to the metal part via a midpoint of connection between the first adjustment capacitor and the second adjustment capacitor.

6. The coil unit according to claim 4, further comprising:

a first reactance circuit that is connected to the one end portion of the winding of the power transmission coil, and forms a resonant circuit together with the power transmission coil; and a second reactance circuit that is connected to the other end portion of the winding of the power transmission coil, and forms a resonant circuit together with the power transmission coil.

7. A coil unit comprising:

a power transmission coil;

a reactance circuit that forms a resonant circuit together with the power transmission coil;

a metal part disposed on a same side as a back side of the power transmission coil; and an adjustment capacitor that reduces a difference between a value of voltage applied via a parasitic capacitance created between a winding of the power transmission coil and the metal part, and a value of voltage applied across the reactance circuit, the adjustment capacitor having a capacitance other than any parasitic capacitances generated by and between the winding of the power transmission coil and the metal part.

8. A wireless power feeding device comprising a power source;

a power conversion circuit; and a power feeding coil unit, wherein the power feeding coil unit is the coil unit according to claim 1.

9. A wireless power receiving device comprising a rectification section; and a power receiving coil unit, wherein the power receiving coil unit is the coil unit according to claim 1.

10. A wireless power transmission device comprising:

a wireless power feeding device having a power feeding coil unit; and a wireless power receiving device having a power receiving coil unit, wherein at least one of the power feeding coil unit and the power receiving coil unit is the coil unit according to claim 1.

11. A wireless power feeding device comprising a power source;

a power conversion circuit; and a power feeding coil unit, wherein the power feeding coil unit is the coil unit according to claim 4.

12. A wireless power receiving device comprising a rectification section; and a power receiving coil unit, wherein the power receiving coil unit is the coil unit according to claim 4.

13. A wireless power transmission device comprising:

a wireless power feeding device having a power feeding coil unit; and a wireless power receiving device having a power receiving coil unit, wherein at least one of the power feeding coil unit and the power receiving coil unit is the coil unit according to claim 4.

14. A wireless power feeding device comprising a power source;

a power conversion circuit; and a power feeding coil unit, wherein the power feeding coil unit is the coil unit according to claim 7.

15. A wireless power receiving device comprising a rectification section; and a power receiving coil unit, wherein the power receiving coil unit is the coil unit according to claim 7.

16. A wireless power transmission device comprising:

a wireless power feeding device having a power feeding coil unit; and a wireless power receiving device having a power receiving coil unit, wherein at least one of the power feeding coil unit and the power receiving coil unit is the coil unit according to claim 7.

* * * * *